United States Patent
Cain, III et al.

(10) Patent No.: US 9,626,187 B2
(45) Date of Patent: Apr. 18, 2017

(54) TRANSACTIONAL MEMORY SYSTEM SUPPORTING UNBROKEN SUSPENDED EXECUTION

(75) Inventors: Harold W. Cain, III, Hartsdale, NY (US); Bradly G. Frey, Austin, TX (US); Benjamin Herrenschmidt, Narrabundah (AU); Hung Q. Le, Austin, TX (US); Cathy May, Ossining, NY (US); Maged M. Michael, Danbury, CT (US); Jose E. Moreira, Yorktown Heights, NY (US); Priya A. Nagpurkar, Ossining, NY (US); Naresh Nayar, Rochester, MN (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 2008 days.

(21) Appl. No.: 12/788,351

(22) Filed: May 27, 2010

(65) Prior Publication Data
US 2011/0296148 A1    Dec. 1, 2011

(51) Int. Cl.
*G06F 15/00*    (2006.01)
*G06F 7/38*    (2006.01)
*G06F 9/00*    (2006.01)
*G06F 9/44*    (2006.01)
*G06F 9/30*    (2006.01)
*G06F 9/46*    (2006.01)
*G06F 9/38*    (2006.01)

(52) U.S. Cl.
CPC ........ *G06F 9/30087* (2013.01); *G06F 9/3842* (2013.01); *G06F 9/3863* (2013.01); *G06F 9/3865* (2013.01); *G06F 9/467* (2013.01)

(58) Field of Classification Search
None
See application file for complete search history.

(56) References Cited

U.S. PATENT DOCUMENTS 5,907,673 A    5/1999 Hirayama et al.
6,202,079 B1    3/2001 Banks
(Continued)

OTHER PUBLICATIONS

Bobba, Jayaram et al., "Performance Pathologies in Hardware Transactional Memory", ACM, ISCA '07, Jun. 9-13, 2007, 11 pages.
(Continued)

*Primary Examiner* — George Giroux
(74) *Attorney, Agent, or Firm* — Stephen J. Walder, Jr.; Jennifer R. Davis

(57) ABSTRACT

Mechanisms are provided, in a data processing system having a processor and a transactional memory, for executing a transaction in the data processing system. These mechanisms execute a transaction comprising one or more instructions that modify at least a portion of the transactional memory. The transaction is suspended in response to a transaction suspend instruction being executed by the processor. A suspended block of code is executed in a non-transactional manner while the transaction is suspended. A determination is made as to whether an interrupt occurs while the transaction is suspended. In response to an interrupt occurring while the transaction is suspended, a transaction abort operation is delayed until after the transaction suspension is discontinued.

21 Claims, 7 Drawing Sheets

(56) References Cited

U.S. PATENT DOCUMENTS

| | | |
|---|---|---|
| 6,795,966 B1 | 9/2004 | Lim et al. |
| 7,376,860 B2 | 5/2008 | Jia et al. |
| 7,882,339 B2 | 2/2011 | Jacobson et al. |
| 7,987,386 B2 | 7/2011 | Jia et al. |
| 2006/0294326 A1 | 12/2006 | Jacobson et al. |
| 2007/0239942 A1* | 10/2007 | Rajwar et al. ............... 711/147 |
| 2008/0016325 A1 | 1/2008 | Laudon et al. |
| 2008/0120299 A1* | 5/2008 | Duffy et al. ..................... 707/8 |
| 2008/0216089 A1 | 9/2008 | Jia et al. |
| 2009/0254905 A1 | 10/2009 | Yip et al. |
| 2010/0023703 A1 | 1/2010 | Christie et al. |
| 2010/0077368 A1 | 3/2010 | Papa et al. |
| 2011/0119528 A1 | 5/2011 | Karlsson et al. |
| 2011/0209151 A1 | 8/2011 | Chung et al. |
| 2011/0264898 A1 | 10/2011 | Chaudhry et al. |
| 2012/0005461 A1 | 1/2012 | Moir et al. |
| 2012/0084477 A1 | 4/2012 | Arndt et al. |

OTHER PUBLICATIONS

Herlihy, Maurice et al., "Transactional Memory: Architectural Support for Lock-Free Data Structures", Proceedings of the 20th Annual International Symposium on Computer Architecture, May 1993, pp. 289-300.

Moravan, Michelle J. et al., "Supporting Nested Transactional Memory in LogTM", Proceedings of the 12th International Conference on Architectural Support for Programming Languages and Operating Systems (ASPLOS), San Jose, CA, Oct. 21-25, 2006, pp. 1-12.

Zilles, Craig et al., "Extending Hardware Transactional Memory to Support Non-busy Waiting and Non-transactional Actions", Workshop on Transactional Memory, 2006, 10 pages.

U.S. Appl. No. 13/465,115.

U.S. Appl. No. 12/894,308.

Notice of Allowance mailed Apr. 29, 2013 for U.S. Appl. No. 13/465,115; 12 pages.

* cited by examiner

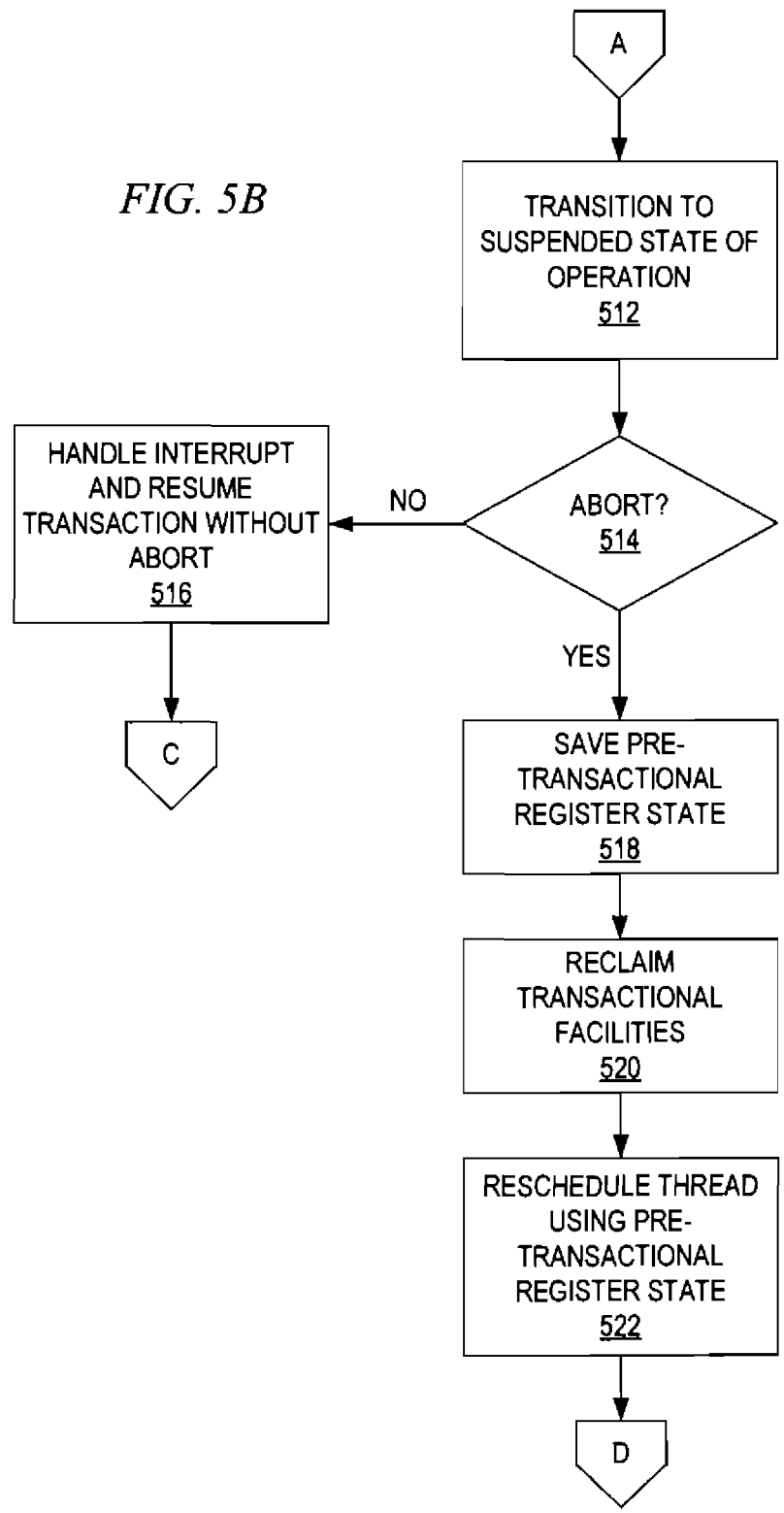

TRANSACTIONAL MEMORY SYSTEM SUPPORTING UNBROKEN SUSPENDED EXECUTION

BACKGROUND

The present application relates generally to an improved data processing apparatus and method and more specifically to mechanisms for providing a transactional memory system that supports unbroken suspended execution.

In speculative parallelization systems, also known as thread-level speculation (TLS) or multi-scalar systems, a compiler, runtime system, or programmer may divide the execution of a program among multiple threads, i.e. separately managed sequences of instructions that may execute in parallel with other sequences of instructions (or "threads"), with the expectation that those threads will usually be independent, meaning that no thread will write data that other threads are reading or writing concurrently. Due to the difficulty in statically determining the memory locations that will be accessed by threads at compilation time, this expectation is not always met. The parallel threads may actually make conflicting data accesses. Such parallelization systems use speculative execution to attempt to execute such threads in parallel. It is the responsibility of the system to detect when two speculative threads make conflicting data accesses, and recover from such a mis-speculation.

Each parallel thread corresponds to a segment of the original sequential code, and the parallel threads are therefore ordered with respect to one another according to their sequence in the sequential version of code. It is the responsibility of the system to ensure that the results of a speculative thread are not committed until all prior speculative threads in this sequence are known to be free of conflicts with the committing thread. Once it has been determined that the thread does not conflict with any threads in the prior sequence, and prior threads have committed, that thread may commit.

Systems that support transactional memory typically include a subset of the requirements of a system that supports speculative parallelization. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur, i.e. the transaction is aborted and any changes made by the execution of the instructions in the transaction are rolled-back. In this way, with atomic transactions, the instructions of the transaction appear to occur all at once in a single instant between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library with minimal hardware support.

As described in Bobba et al., "Performance Pathologies in Hardware Transactional Memory," ISCA '07, Jun. 9-13, 2007, a programmer can invoke a transaction in a multi-threaded application and rely on the transactional memory system to make its execution appear atomic in a global serial order. Bobba et al. discusses conflict resolution policies in transactional memory systems, however, the concept of transactional memory was introduced by Herlihy and Moss "Transactional Memory: Architectural Support for Lock-Free Data Structures," Proceedings of the 20th Annual International Symposium on Computer Architecture, pp. 289-300, May 1993.

Transactional memory systems seek high performance by speculatively executing transactions concurrently and only committing transactions that are non-conflicting. A conflict occurs when two or more concurrent transactions access the same piece of data, e.g. a word, block, object, etc., and at least one access is a write. Transactional memory systems may resolve some conflicts by stalling one or more transactions.

Transactional blocks are typically demarcated in a program with special transaction begin and end annotations. Transactional blocks may be uniquely identified by a static identifier, e.g., the address of the first instruction in the transactional block. Dynamically, multiple threads can concurrently enter a transactional block, although that transactional block will still share the same static identifier.

In addition to the ability to revert, or roll-back, changes made to memory and registers made during the speculative execution of a transaction, transactional memory systems often support the detection of conflicting accesses made by speculative threads. However, maintaining the proper ordering of speculative threads is not naturally supported by transactional memory systems. Because a transaction should not commit until prior speculative threads in the sequence have committed, some communication among speculative threads is required. However, by definition, transactions are intended to be isolated from one another such that any communication amongst transaction threads through shared memory will cause the transactions to be aborted.

SUMMARY

In one illustrative embodiment, a method in a data processing system having a processor and a transactional memory, for executing a transaction in the data processing system is provided. The method comprises executing, by a processor of the data processing system, a transaction comprising one or more instructions that modify at least a portion of the transactional memory. The method further comprises suspending, by the processor, the transaction in response to a transaction suspend instruction being executed by the processor. The method also comprises executing, by the processor, a suspended block of code in a non-transactional manner while the transaction is suspended. Furthermore, the method comprises determining, by the processor, if an interrupt occurs while the transaction is suspended. In addition, the method comprises delaying, by the processor, a transaction abort operation until after the transaction suspension is discontinued and the transaction resumes, in response to an interrupt occurring while the transaction is suspended.

In another illustrative embodiment, a method, in a multithreaded data processing system having a processor and a transactional memory, for executing a transaction in the multithreaded data processing system is provided. The method comprises executing, by at least one processor of the multithreaded data processing system, a sequence of threads comprising at least a first speculative thread and a second speculative thread. Each thread has an associated sequence number specifying its position in the sequence of threads. The first speculative thread is used to execute a first transaction and the second speculative thread is used to execute a second transaction. The method further comprises suspending, by the at least one processor, the first transaction in response to a transaction suspend instruction being executed by the at least one processor. In addition, the method comprises executing, by the at least one processor, a suspended block of code in a non-transactional manner while the first transaction is suspended. The suspended block of code executes a loop to wait until the second transaction writes the sequence number of the second speculative thread to a variable, monitored by the suspended block of code, indicating that execution of the second transaction has completed execution successfully. Furthermore, the method comprises resuming, by the at least one processor, execution of the first transaction associated with the first speculative thread in response to the sequence number of the second speculative thread being written to the variable.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B illustrate a flowchart outlining an example operation for handling execution of a suspended block of code within a transaction in accordance with one illustrative embodiment.

DETAILED DESCRIPTION

Figure 1:
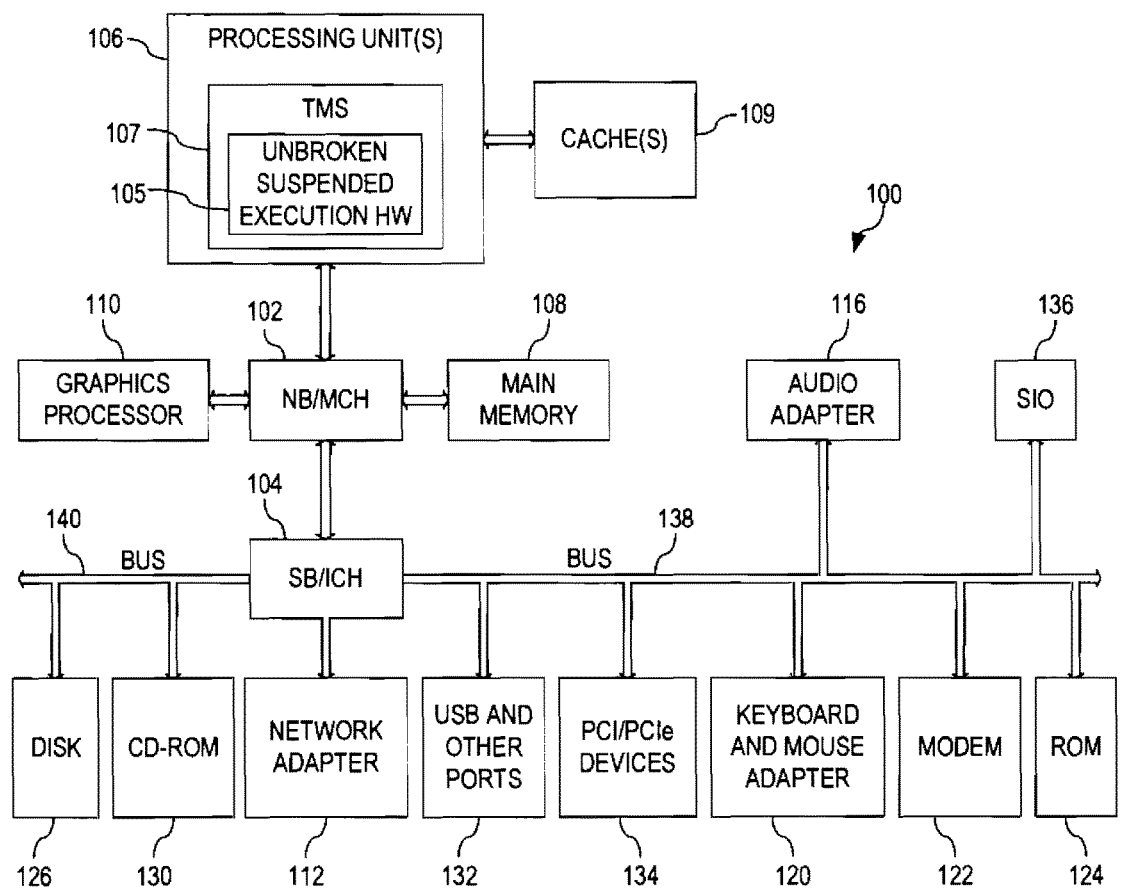
FIG. 1 is a block diagram of a data processing system is shown in which illustrative embodiments may be implemented.

As discussed above, in traditional transactional memory systems, updates to memory performed during a transaction are discarded if the transaction is aborted. However, in some circumstances, it is desirable for certain updates to memory caused by the transaction to be retained. For example, while debugging, a programmer may often wish to save some information about the in-flight transaction prior to the transaction abort in order to understand the behavior of the transaction. Similarly, a profiler may wish to instrument transactional code by inserting updates to profiling metadata where these updates should not be discarded upon abort.

In addition to the loss of updates when a transaction aborts, transactional memory systems also often restrict the set of operations that are allowed to be included in a transaction to a set of operations that are known to be transaction safe because an implementation supports rolling back architectural changes performed by this set of operations. If such an operation occurs during a transaction, the transaction is aborted. Consequently, it is sometimes desirable for an expert programmer to mark a block of code in which a disallowed operation occurs, thereby causing the transactional memory system to allow the operation.

Furthermore, transactional memory systems isolate accesses made within a transaction from other threads, preventing shared-memory communication from occurring. In some circumstances, it may be desirable to allow communication among transactions via shared memory, without causing a transaction to be aborted.

All of these features may be supported by treating a subset of operations within a transaction as if they are non-transactional. In prior work, support for such non-transactional operations have been proposed as "escape actions" or transaction "pause and unpause" actions. An example of "escape actions" is described in Moravan et al., "Supporting Nested Transactional Memory in Log™," ASPLOS-XII: Proceedings of the 12th International Conference on Architectural Support for Programming Languages and Operating Systems, 2006. An example of transaction "pause and unpause" actions is described in Zilles et al., "Extending Hardware Transactional Memory to Support Nonbusy Waiting and Nontransactional Actions," 2006 Workshop on Transactional Memory. These features allow a programmer to temporarily suspend transactional execution, perform a set of non-transactional operations, and then resume the transaction. Should the transaction be aborted, the non-transactional actions will not be rolled back.

A problem with known mechanisms for suspending a transactional block is in the semantics of a suspended block of code with respect to transaction abort. With known suspension mechanisms, if a transaction failure occurs during execution of the suspended portion of code, the suspended portion of code, i.e. the non-transactional portion of code, is immediately aborted and is not allowed to complete before the abort handling is performed by a transaction controller. This may lead to data being in an inconsistent state in the memory since changes made by the non-transactional portion of code, i.e. the suspended block of code, are not rolled back. For example, a transaction may fail while it is suspended if any of the storage locations that were accessed before it was suspended are overwritten by another thread. Also, in some implementations which use caches to track transactionally accessed cache blocks, if a transactionally accessed cache block is evicted from the cache during the suspended mode of execution, this can also cause transaction failures.

If transaction failure is detected during the suspended portion of code, however, it is desirable for the system to permit the suspended block of code to run to completion, suppressing any transaction abort handling that may occur until end of the suspended block has been reached. This is referred to as an "unbroken" suspend block as opposed to a suspend block implementation that forces immediate abort handling without having completed the code in non-transactional portion, or suspended block, of code. Support for such an "unbroken" suspended block of code provides a programming model advantage over regular suspended blocks of code that may terminate prematurely because the programmer is able to perform an arbitrary set of operations to their completion without concern of control flow being transferred to an abort handler in the middle of the suspended block of code, which can potentially leave data in an inconsistent state. Thus, "unbroken" suspended blocks of code ensure consistent state of data in the memory of the data processing system employing such transactional memories with unbroken suspended blocks of code.

In hardware transactional memory systems, support for unbroken suspended blocks of code is complicated by the occurrence of interrupts. During execution of a suspended block, i.e. a non-transactional block of instructions, the application effectively has two sets of registers and memory contexts: (1) the current execution context, which is updated by the suspended block of code; and (2) the pre-transactional context to which the data processing system's memory is reverted if an abort of the transaction occurs. When an interrupt occurs, if the operating system, hypervisor, or the like, performs a context or logical partition switch during the execution of the suspended block of code, both sets of contexts must be saved, i.e. the current context to which the application should resume following the interrupt, and the pre-transactional context to which the application should be redirected when the execution of the suspended block code is completed.

The illustrative embodiments provide a mechanism for supporting unbroken suspended execution. The mechanisms include a set of hardware interfaces for use by an operating system, hypervisor, virtualization intermediary, or the like, that provides the operating system, hypervisor, virtualization intermediary, or the like, with a functionality to save the register states, both precise (i.e. the current context) and the pre-transactional (i.e. the state just prior to a start of the execution of the transaction) for the application when interrupting a suspended transaction. Logic is provided such that the application, when rescheduled, continues the execution of the suspended code, i.e. the non-transactional portion of code, from the precise interrupt location until the transaction is resumed. Logic is further provided for generating an interrupt upon resuming the transaction thereby transferring control back to the operating system, hypervisor, etc., to restore pre-transactional register state and invoke the transaction abort handler of the transaction controller. The mechanisms of the illustrative embodiments can be implemented using a single hardware register checkpoint as opposed to complex virtualized transactional memory systems.

In some illustrative embodiments, the operating system itself may be considered one example of an unbroken suspended block of code. Upon the occurrence of an interrupt during a user-level transaction, the transaction is suspended. When returning from the interrupt, the transaction is resumed. The suspend on interrupt model flexibly supports arbitrary operating systems interactions within transactions, when desired.

The mechanisms for providing unbroken suspended blocks of code in the illustrative embodiments may be further utilized to provide support for thread level speculation in a transactional memory system. With the mechanisms of the illustrative embodiments, a sequence of speculative threads are spawned by a main thread, where each speculative thread is assigned a sequence number identifying the position of the thread within the sequence such that it can be determined in what order that thread should commit. Each thread executes is corresponding portion of work, but does not commit until it has received a notification that the prior thread to the present thread has committed through a shared memory flag mechanism. The shared memory flag mechanism indicates the sequence number of the most recent thread to have successfully committed. Before a thread n commits, it suspends the transaction which the thread is committing and, in a non-transactional operation, polls the shared memory flag mechanism to make sure that thread n−1 committed before committing its own results.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. FIG. 1 is only an example and is not intended to state or imply any limitation with regard to the various data processing system configurations, architectures, and the like, that may be used with the mechanisms of the illustrative embodiments. In short, the mechanisms of the illustrative embodiments may be implemented with any data processing system that implements a transactional memory system.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

In accordance with the mechanisms of the illustrative embodiments, the data processing system of FIG. 1 implements a transactional memory system 107. This transactional memory system 107 may be implemented with regard to one or more caches 109 associated with the processing unit(s) 106, the main memory 108, a combination of caches 109 and main memory 108, or the like. As noted above, the transactional memory system 107 may be implemented as a hardware transactional memory system, software transactional memory system, or a hybrid hardware/software transactional memory system. In accordance with the illustrative embodiments, a hybrid hardware/software transactional memory system 107 is utilized in which unbroken suspended execution hardware 105 is provided in the processing unit(s) 106 and software mechanisms are executed by the processing units 106 to support such unbroken suspended executions of transactions with regard to the transactional memory system 107.

As discussed above, the transactional memory system 107 of the illustrative embodiments utilizes a set of hardware interfaces, in the unbroken suspended execution hardware 105, for use by an operating system, hypervisor, virtualization intermediary, or the like, (hereafter assumed to be an operating system for simplicity of the description) that provides a functionality to save the register states, both precise and the pre-transactional, for the application when interrupting a suspended block of code, i.e. a non-transactional block of code, executing within the suspended transaction. The "precise" register state refers to the state of the registers at the time of an interrupt or error condition occurring. The "pre-transactional" register state refers to the state of program registers at a time just prior to entry into the transaction, i.e. just prior to the transaction begin instruction, as discussed hereafter. The "pre-transactional" register state may be used in the event that a roll-back of a transaction becomes necessary. The "precise" register state may be used in the event that an interrupt or error condition occurs during the execution of a suspended block of code, i.e. after a transaction suspend instruction but prior to a transaction resume instruction, as discussed hereafter, such that the interrupted suspended block of code may be completed prior to roll-back of the transaction.

Hardware and/or software logic is provided in this transactional memory system 107 for continuing the execution of the suspended code, i.e. the non-transactional portion of code executing in the middle of a transaction between a transaction begin instruction and a transaction end instruction, from the precise interrupt location when the application is rescheduled, until the transaction is resumed. Hardware and/or software logic is further provided for generating an interrupt upon resuming the transaction thereby transferring control back to the operating system, hypervisor, etc., to restore pre-transactional register state and invoke the transaction abort handler of the transaction controller. In this way, the suspended block of code is permitted to continue executing even in the event of an exception condition during the execution of the suspended block of code and thus, updates to the memory (cache(s) 109 or main memory 108) may be made without roll-back by this suspended block of code, but the transaction may be rolled-back upon abort of the transaction due to the exception condition once the suspended block of code completes execution.

Figure 2:
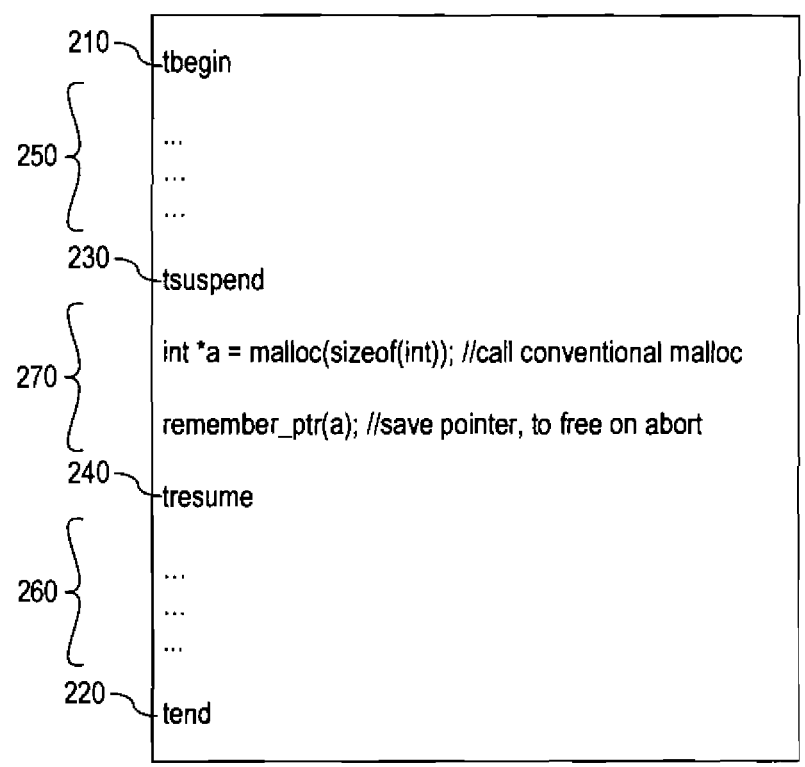
FIG. 2 is an example diagram illustrating a portion of code to be executed as a transaction with a transactional memory system in accordance with one illustrative embodiment.

FIG. 2 is an example diagram illustrating a portion of code to be executed as a transaction with a transactional memory system, such as transactional memory system 107 in FIG. 1, in accordance with one illustrative embodiment. Transactions, such as the one shown in FIG. 2, for example, in the transactional memory system 107 of the illustrative embodiments are initiated using a transaction begin instruction "tbegin" 210 in the portion of code constituting the transaction 200, and are ended with a transaction end instruction "tend" 220. During execution of the transaction 200, the processing unit(s) 106 execute in a transactional mode that includes use of a transaction controller that has a transaction abort engine for detecting transaction failures and performing abort operations to roll-back changes made by the transaction 200 to the memory, i.e. cache(s) 109 and/or main memory 108. A transaction 200 may be suspended using a suspend instruction "tsuspend" 230 or as a side-effect of an interrupt. Once suspended, the transaction may be resumed using a resume instruction "tresume" 240, or after return from an interrupt.

During suspended transactional execution, the processing unit(s) 106 executes in a suspended mode. The transactional mode and suspended mode of operation of the processing units 106 may be identified by an appropriate mode register in the processing units 106 that identifies an operating mode of the corresponding processing unit 106. Hardware logic may be provided in the processing units 106 such that the value in this mode register may be set in response to a "tbegin," "tend", "tsuspend", or "tresume" instruction being processed by the processing unit 106. For example, when a tbegin instruction is executed, the value in the mode register may be set to indicate that the processing unit 106 is operating in a transaction mode. When a tsuspend instruction is executed, the value in the mode register may be set to indicate that the processing unit 106 is operating in a suspended mode of operation. When a tresume instruction is executed, the value in the mode register may be set to indicate that the processing unit 106 is operating in a transaction mode. When a tend instruction is executed, the value in the mode register may be set to indicate that the processing unit 106 is operating in a non-transaction mode.

With the mechanisms of the illustrative embodiments, in suspended mode of operation of the processing units 106, transaction abort handling is deferred until the transaction 200 is resumed, e.g., after the "tresume" instruction is executed. Interrupts or error conditions that occur during a suspended mode of operation may still be handled by appropriate interrupt handling with rescheduled instructions or resumption of the execution being made to the instruction of the suspended block of code that was executing at the time of the interrupt/error condition using the precise register state, as discussed in greater detail hereafter. Once the suspended block of code completes execution, the transaction is resumed and an interrupt is immediately generated to invoke the transaction abort handling.

For example, in the transaction 200 in FIG. 2, if an interrupt or exception condition occurs in the middle of the call to the memory allocation instruction "malloc", which is part of a suspended block of code 270, and the operating system wants to switch threads, in known mechanisms the transaction abort handling occurs immediately which can leave internal malloc data structures in an inconsistent state. However, with the mechanisms of the illustrative embodiments, rather than reverting the changes to memory and register state, and branching execution to a software failure handler, if an interrupt or exception condition occurs in the middle of the call to malloc in the transaction 200, this abort handling is deferred until the transaction is resumed, such as by the "tresume" instruction, with the suspended block of instructions 270 being allowed to resume at an interrupted instruction prior to resuming the transaction. In this way, the call to malloc is allowed to complete, and in the process make its non-transactional changes to memory, with rollback of changes made to memory by the transactional block 250 of the transaction 200, upon resuming the transaction, by the transaction abort handling engine. The other transactional blocks 260 of the transaction 200 are not rolledback because they are not executed as a result of the interrupt and branching to the software abort handler. In this way, an unbroken suspend mode of operation is enabled in the processing unit(s) 106.

Figure 3:
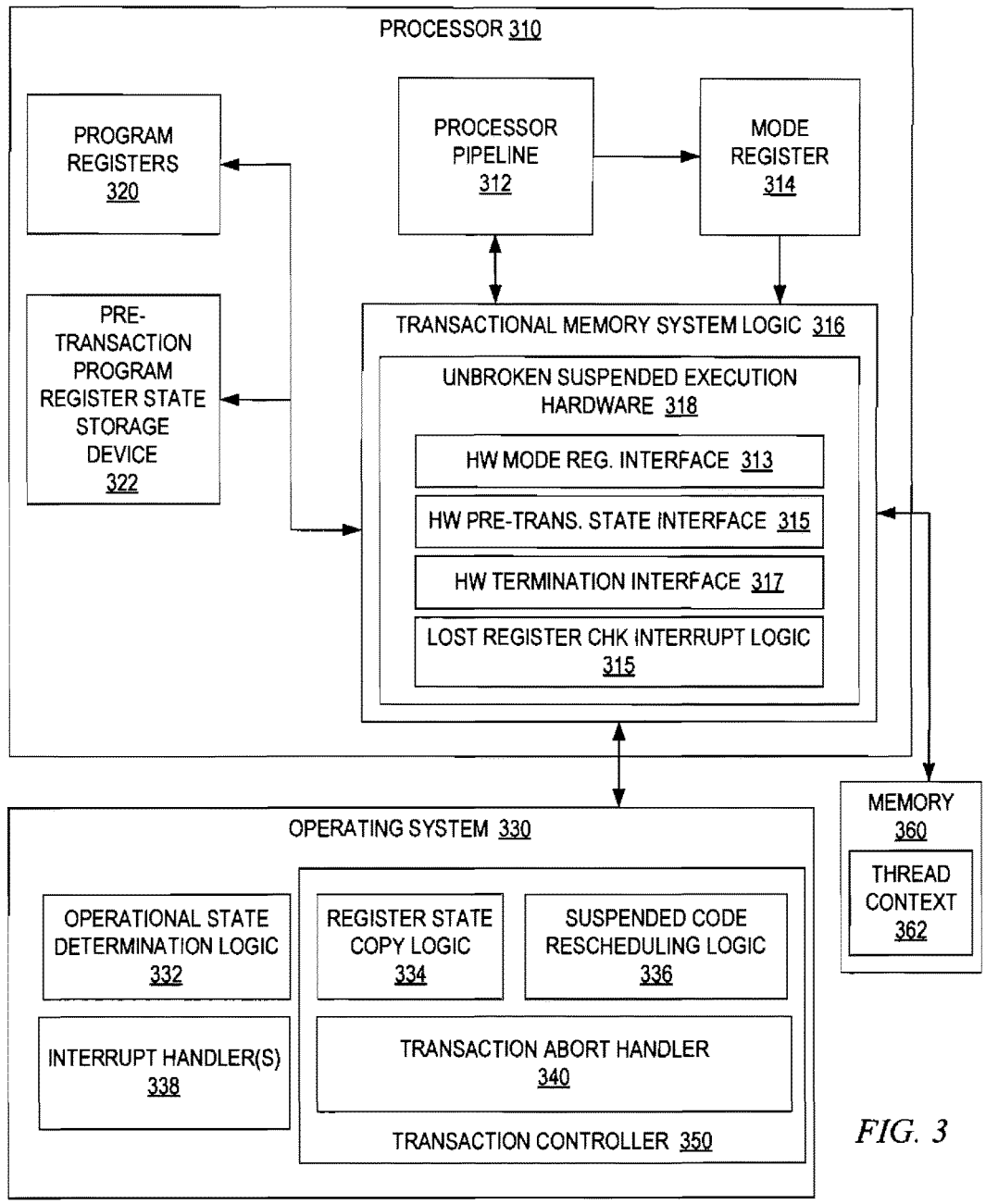
FIG. 3 is an example diagram illustrating these hardware and software support mechanisms for supporting an unbroken suspend mode of operation in accordance with one illustrative embodiment.

In order to provide this unbroken suspend mode of operation, various hardware support mechanisms are provided in the processing unit(s) 106 and software support mechanisms are provided in an operating system, hypervisor, virtualization intermediary, or other low level software close to the hardware. FIG. 3 is an example diagram illustrating these hardware and software support mechanisms for supporting an unbroken suspend mode of operation in accordance with one illustrative embodiment.

As shown in FIG. 3, the processor 310 comprises, among other elements not shown, a processor pipeline 312, a mode register 314, transactional memory system logic 316, program registers 320, and a pre-transaction register state storage device 322. The transactional memory system logic 316 further comprises unbroken suspended execution hardware 318 for implementing the unbroken suspended block of code execution within a transaction in accordance with the illustrative embodiments. In order to facilitate such an unbroken suspended block of code execution, the hardware 318 includes a hardware (HW) mode register interface 313, a hardware pre-transaction state interface 315, a hardware termination interface 317, and lost register checkpoint interrupt logic 319. These elements operate in concert with the processor pipeline 312, mode register 314, program registers 320, pre-transactional program register storage device 322, and thread contexts 362 in memory 360 to implement the operations and functionality as described herein to support such unbroken suspended execution hardware 318. These elements further work in concert with software mechanisms provided in an operating system, hypervisor, virtualization intermediary, or the like (generally represented as operating system 330 in FIG. 3). The elements shown as part of processor 310 are implemented in hardware, such as circuitry and logic elements, on an integrated circuit chip or chips, multi-chip module, or the like.

As shown in FIG. 3, the operating system 330 may include a transaction controller 350 having operational state determination logic 332, register state copy logic 334, suspended code rescheduling logic 336, interrupt handler(s) 338, and transaction abort handler 340. The elements shown as being part of operating system 330 are implemented as software, i.e. a set of code or instructions, that is executed on one or more processors of a data processing system, such as processor 310. The software elements of the operating system 330 operate with the hardware elements of the processor 310 to support the unbroken suspended execution mechanisms of the illustrative embodiments.

With reference to the particular elements shown in FIG. 3, portions of code are executed by the processor 310 through processor pipeline 312 as is generally known in the art. In accordance with the illustrative embodiments, as part of the execution of the code, instructions processed in the processor pipeline 312 may be decoded and, as a result, certain instructions may cause a value in the mode register 314 to be set to various values indicating a current execution mode of the processor 310. For example, in response to the decoding of an instruction indicating an opcode for a transaction begin instruction (tbegin), the hardware of the processor 310 may set a value in the mode register 314 indicating that the processor 310 is operating in a transaction mode. In response to the decoding resulting in an opcode for a transaction end instruction (tend), the value in the mode register 314 may be set to a non-transaction mode operation value. In response to the decoding resulting in an opcode for a transaction suspend instruction (tsuspend), the value in the mode register 314 may be set to a suspended execution mode of operation value. In response to the decoding resulting in an opcode for a transaction resume instruction (tresume), the value in the mode register 314 may be set to a transaction mode operation value.

The other hardware elements and software mechanisms may access the mode register 314 to determine what mode of operation the processor is operating in at the time of an interrupt, as discussed hereafter. Access to the mode register 314 may be obtained via the hardware mode register interface 313 in the unbroken suspended execution hardware 318 of the transactional memory system logic 316.

The program registers 320 store values used by the code executed by the processor pipeline 312 as the instructions in the code are processed within the pipeline 312. The pre-transaction register state storage device 322 stores the state of the program registers 320 in response to a transaction being started in the processor pipeline 312, e.g., in response to a transaction begin instruction (tbegin) flowing into the processor pipeline 312. The pre-transaction register state storage device 322 stores the state of the registers 320 just prior to entry into the transaction. The precise register state of the program registers 320 at a point in time when an interrupt occurs during a transaction, i.e. when the processor 310 is operating in a transaction mode as indicated by the mode register 314, may be stored in a thread context 362 of a memory 360.

The hardware pre-transaction state interface 315 provides a hardware interface through which the operating system 330 and other hardware elements may access the pre-transaction register state storage device 322. The interface 315 may be used to both copy over the program registers 320 to the pre-transaction register state storage device 322 and to read the pre-transaction register state from the storage device 322. For example, when a transaction begin (tbegin) instruction is processed by the processor pipeline 312, the decoding of this tbegin instruction sends a signal to the transactional memory system logic 316 to cause the program registers 320, or at least a portion of these registers 320, to be copied over to the pre-transaction register state storage device 322 via the hardware pre-transaction state interface 315. This copy may also be done lazily as those program registers are overwritten during the execution of a transaction. Moreover, when a transaction abort condition occurs, a transaction abort handler 340 of the operating system 330 may restore the state of the program registers 320 by rolling-back changes to the program registers 320 using the pre-transaction register state stored in the storage device 322, via the hardware pre-transaction state interface 315.

The hardware pre-transaction state interface 315 may further maintain a status flag value indicating whether the contents of the pre-transaction register state storage device 322 remain valid or not. This flag is used to resolve race conditions where two or more processes are trying to reclaim transaction facilities. For example, assume that a transaction is interrupted by the operating system and the operating system determines that the transaction facilities are to be reclaimed using a hardware termination interface 317. However, immediately before the operating system is able to reclaim these transaction facilities, a hypervisor interrupt occurs and while the hypervisor is executing, it reclaims the transaction facilities. When the execution later returns to the operating system after the hypervisor reschedules the operating system, the operating system will be attempting to reclaim the transaction facilities which have already been reclaimed by the hypervisor. Thus, the status flag is used to indicate whether the reclaiming of the transaction facilities was successful or not. This status flag is returned by the transaction termination interface 317 to the particular operating system, hypervisor, or other process trying to reclaim the facilities to indicate whether the abort of the transaction was successful or not.

The hardware termination interface 317 provides logic for terminating a transaction without affecting program control flow. For example, the hardware termination interface 317 may be used by the operating system to terminate any currently executing transaction and reclaim any resources, or facilities, associated with that transaction, in order to enable subsequent use of the transactional facility. The hardware termination interface 317 may be used by the transaction abort handler 340 to restore the state of the program registers 320 and memory that was changed by the transaction such that the changes made by the transaction are rolled-back and not committed. The hardware termination interface 317 may work in conjunction with the hardware pre-transaction state interface 315 to save, in a thread context 362 in memory 360 for the thread executing the transaction, the pre-transaction state information from the storage device 322 when terminating the transaction. The hardware termination interface 317 may return a Boolean indicator to the operating system code, hypervisor code, or the like, that is attempting to terminate the transaction, indicating whether the termination was successful or whether the transaction had already been terminated. This Boolean indicator is the status flag previously mentioned above.

The lost register checkpoint interrupt logic 319 provides hardware logic for generating an interrupt when a suspended transaction that was previously terminated is resumed. That is, the lost register checkpoint interrupt is generated such that it is triggered when a transaction is resumed after an interrupt or exception condition occurs during execution of a suspended block of code, i.e. non-transactional portion of code, in the middle of the transaction. The lost register checkpoint interrupt logic 319 may be used to throw an exception or cause an interrupt of the program execution in response to a tresume instruction being decoded in the processor pipeline 312.

As shown in FIG. 3, the operating system 330 includes interrupt handlers 338 and operational state determination logic 332 for determining the operational state of the processor 310 in response to the occurrence of an interrupt or exception condition. While this logic 332 is shown as separate from the interrupt handlers 338, this logic 332 may in fact be integrated with the interrupt handlers 338 such that the interrupt handlers are augmented with logic to determine the operational mode of the processor 310. The operational state determination logic 332 may be used by the interrupt handlers 338 to access the mode register 314 via the hardware mode register interface 313 to retrieve a value indicative of the operational state of the processor 310 at the time of an interrupt. For example, the value in the mode register 314 may indicate whether the processor 310 was in a non-transactional mode, a transactional mode, or a suspended mode of operation at the time of the interrupt. In this way, the interrupt handlers 338 may determine whether the interrupt occurred during normal execution of the program, during a transaction portion of the program, or during execution of a suspended block of code within a transaction.

The register state copy logic 334 of the operating system 330 operates to cause the copying of program register 320, and the pre-transaction register state storage device 322. The register state copy logic 334, or other hardware in the processor, copies the program registers 320 to the pre-transaction register state storage device 322 upon the detection of the begin of a transaction in processor pipeline 312. When an interrupt handler 338 detects an interrupt occurring while the processor 310 is in a suspended mode of operation, the interrupt handler 338 may request that the register state copy logic 334 initiate a copy of the current state of the program registers 320 to the thread's context 362 in memory 360. This precise state may then be used once the interrupt handler 338 finishes handling the interrupt and resumes execution of the suspended block of code by rescheduling the suspended block of code in the processor pipeline 312.

The suspended code rescheduling logic 336 operates to reschedule the suspended block of code from an instruction at which an interrupt occurred, once the interrupt is done being handled by the appropriate interrupt handler 338. The suspended code rescheduling logic 336 causes the state of the program registers 320 to be restored to the precise register state from the thread context 362, which was saved at the time of the interrupt as described above, upon the rescheduling of the suspended block of code, such that the suspended block of code will continue execution using the precise state of the registers at the time of the interrupt. In this way, the suspended block of code is permitted to continue executing even after an interrupt occurs, with the transaction being aborted after the transaction is resumed. The suspended code rescheduling logic 336 may cause the processor pipeline 312 to refetch and execute instructions starting an instruction address corresponding to a program counter value at the time of an interrupt occurring during execution of a suspended block of code.

The lost register checkpoint interrupt logic 319 of the unbroken suspended execution hardware 318 generates a lost register checkpoint interrupt, in response to an interrupt occurring during execution of a suspended block of code, that will occur when the transaction is resumed. In response to an interrupt handler 338 detecting that an interrupt occurred while the processor 310 was in a suspended mode of operation (from mode register 314 via the interface 313 and logic 332), the interrupt handler 338 may signal the lost register checkpoint interrupt logic 319 to generate a lost register checkpoint interrupt. This signaling may be performed, for example, by setting a lost register checkpoint interrupt bit in the lost register checkpoint interrupt logic 319, or elsewhere in the processor 310 hardware but known to the lost register checkpoint interrupt logic 319, indicating that an interrupt occurred during a suspended mode of operation and a lost register checkpoint interrupt is to be generated upon resuming the transaction. The lost register checkpoint interrupt logic 319 generates this interrupt upon resuming the transaction, i.e. upon detecting a tresume instruction in the processor pipeline 312.

The transaction abort handler 340 may operate in response to an interrupt occurring when the processor 310 is in a transaction mode of operation. This interrupt may be a standard interrupt occurring during a transaction or may be a lost register checkpoint interrupt generated as a result of a prior interrupt occurring during execution of a suspended block of code within a transaction. The transaction abort handler 340, in one illustrative embodiment, may operate to revert the state of the program registers 320 and any changes made by the transaction, not including any changes made by the suspended block of code, to the memory to a state prior to initiating the transaction. Thus, in one illustrative embodiment, the transaction abort handler 340 may restore the program registers 320 to a pre-transaction state using the pre-transaction register state storage device 322. Changes to memory may be rolled-back by the transaction abort handler 340 in a manner generally known in the art. The above is an example of "late" memory restoration, however in other illustrative embodiments, the state of the memory may be restored such that changes are rolled-back upon detection of a transaction failure, i.e. "early" memory restoration, with the transaction abort handler 340 performing other operations for reclaiming transaction facilities and reporting the abort of the transaction to the operating system 330.

However, it should be noted that only the changes made to memory by code that is part of the transaction, but not part of a suspended block of code, are rolled-back. Changes made by the suspended block of code to the memory are maintained even in the event of a transaction abort occurring. Changes made by the suspended block of code to the program registers 320, however, are lost upon the occurrence of a transaction abort since the program registers 320 state is reverted using the pre-transaction register state stored in the storage device 322.

Figure 4:
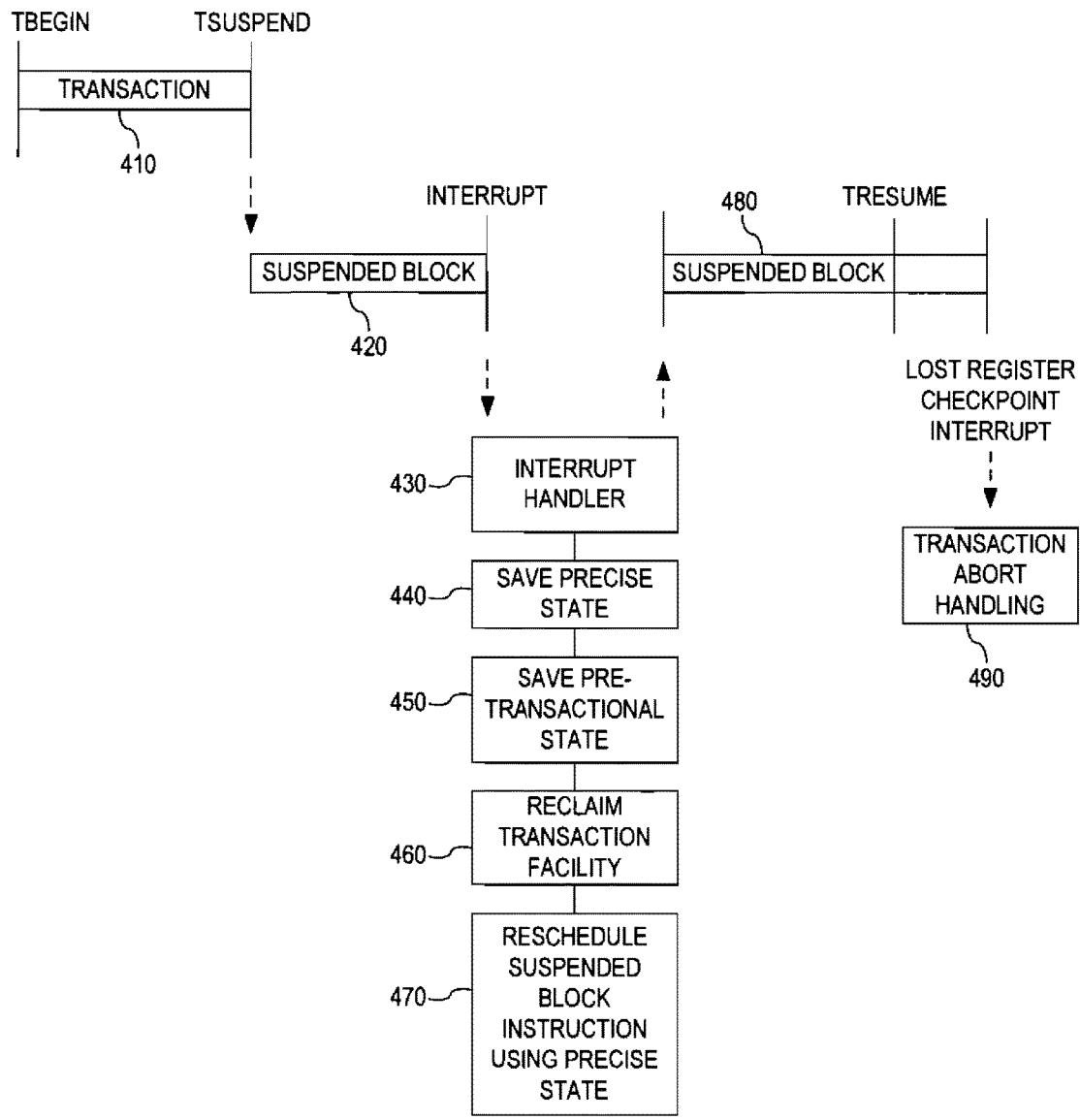
FIG. 4 is an example block diagram illustrating the processing of a transaction having an interrupt occurring during execution of a suspended block of code within the transaction in accordance with one illustrative embodiment.

FIG. 4 is an example block diagram illustrating the processing of a transaction having an interrupt occurring during execution of a suspended block of code within the transaction in accordance with one illustrative embodiment. As shown in FIG. 4, a portion of code may be designated as to be executed as part of a transaction 410 through the use of a transaction begin and transaction end instruction encompassing the portion of code to be included in the transaction, as previously described above. The transaction begin and end instructions may be inserted by the programmer, a compiler, or other optimization mechanism. For example, a compiler, as part of the optimizations that it performs on source code, may analyze the code to identify portions of the code that can be performed in parallel and may modify the code so that the portions of code that can be performed in parallel are executed as transactions.

In addition, the programmer, compiler, tracing and debugging mechanisms, or the like, may insert a suspended block of code into the transaction along with appropriate transaction suspend and resume instructions. For example, a tracing and debugging mechanism may insert a suspended block of code to perform various actions for collecting tracing and debug information from program registers 320, memory, or the like, so as to profile the execution of the computer program. The creation of code that includes transactions with suspended blocks of code is generally known in the art and thus, a more detailed explanation is not provided herein. As a result of the operation of these mechanisms, code having transaction instructions and suspended block of code instructions is provided for execution by a processor, such as processor 310.

When a transaction begin instruction is encountered by the processor pipeline 312, a transaction is created and tracked by the operating system, such as via transaction controller 350. As a result of encountering the transaction begin instruction, the mode register 314 is updated to store a value indicative of the processor 310 being in a transaction mode of operation and the pre-transaction register state is stored in the pre-transaction register state storage device 322, such as by copying the current state of the program registers 320 to the storage device 322, or at least a portion of the program registers 320 is copied to the storage device 322. As mentioned before, this saving of the program registers 320 state may also be done lazily, by waiting until the registers 320 are written until a complete copy of the original program registers 320 is made. The transaction is executed with updates to memory (in a reversible manner) and the program registers 320 being performed by the instructions in the transaction.

At some point during the execution of the transaction 410, a transaction suspend (tsuspend) instruction may be encountered. This tsuspend instruction causes the processor pipeline 312 to again update the mode register 314 to indicate that the processor 310 is operating in a suspended mode of operation. The execution of the suspended block of code 420 is then allowed to progress with updates being made to program registers 320 and memory by the instructions in the suspended block of code 420. The updates to the memory are made in an non-reversible manner while updates to the program registers 320 are reversible in the event of an interrupt occurring during the execution of the suspended block of code.

As shown in FIG. 4, at some point during the execution of the suspended block of code 420, an interrupt may occur. In response to the interrupt occurring, control is transferred to an interrupt handler 338 (430). The interrupt handler 338, or the operational state determination logic 332 at the request of the interrupt handler 338, determines the operational mode of the processor 310 at the time of the interrupt by reading the value stored in the mode register 314. In the depicted example, the mode would be a suspended mode of operation. If the mode of operation is a transaction mode of operation, and the operating system 330 determines that the transactional facility should be reclaimed (e.g. because it will be performing a thread context switch), then control is passed to the transaction abort handler 340 of the transaction controller 350 which handles the aborting of the transaction and rolling-back of any changes made by the transaction. If the mode of operation is non-transactional, then the interrupt handler 338 simply handles the interrupt without having to roll-back any changes made by the code.

If the mode of operation is a suspended mode of operation, as in the depicted example, and the operating system 330 determines that the transactional facility should be reclaimed (e.g., because the operating system 330 will be performing a thread context switch), then the interrupt handler 338 instructs the register state copy logic 334 of the transaction controller 350 to copy the current state of the program registers 320 to a thread context 362 in memory 360, so as to store the precise state of the program registers 320 at the time of the interrupt (440). Additionally, the pre-transactional register state is read from the pre-transactional register state storage device 322 using the pre-transactional state interface 315. This pre-transactional register state is also copied into the thread's context, in a new part of the thread context memory (450). Now that the relevant state has been saved, the transactional facility is ready to be reclaimed (460).

The operating system 330 will reclaim the transaction facility through the execution of a special instruction, which will return a Boolean value indicating that the facility was successfully reclaimed or not. Should the Boolean value indicate the reclaim was not successful, it is an indication that the facility had already been reclaimed by the hypervisor and therefore, the pre-transactional state may need to be obtained from the hypervisor, and saved to the thread context 362 (because the previously read state may have been incorrect/invalid).

Eventually, once the operating system 330 chooses to reschedule the application whose transaction was reclaimed, the suspended code rescheduling logic 336 reschedules the suspended block of code at the instruction where the interrupt occurred using the precise register state stored in the thread context 362 (470). The suspended block of code is then permitted to continue executing (480) until it is complete, i.e. a transaction resume (tresume) instruction is encountered. Of course, if another suspended block of code is encountered, the previous operations are again followed for this additional suspended block of code. When the transaction is resumed, the operational mode of the processor 310 is updated in the mode register to indicate that the processor 310 is again operating in a transaction mode of operation.

Upon resuming the transaction as a result of the transaction resume (tresume) instruction, the lost register checkpoint interrupt occurs. The interrupt handler 338 receives the interrupt and, recognizing that it is a lost register checkpoint type of interrupt, the interrupt handler 338 instructs the transaction abort handler 340 to perform proper transaction abort operations (490) by rolling back changes made to the program registers and memory by the transaction code, but not the suspended block of code. As mentioned earlier, this is an example of "late" memory restoration but the mechanisms of the illustrative embodiments may likewise be applied to "early" memory restoration embodiments as well.

In an embodiment where the memory is a cache of the processor, in order to facilitate this rolling-back of changes made by the transaction but not the suspended block of code, in the transactional mode of operation, store instructions mark cache lines by setting a speculative bit indicating that they contain speculative data. Before writing the data to the cache line, a backup copy of the data is made. In the event of a transaction failure, all cache lines that have this speculative bit set are made invalid, which causes subsequent accesses to the cache line to get the backup copy of the data. When in the suspended mode of operation, this process is not followed. Instead, the data is written in a conventional way. Thus, changes made by suspended blocks of code during a suspended mode of operation are not marked as speculative or invalid.

Thus, with the mechanisms of the illustrative embodiments, the aborting of the transaction is delayed until after the suspended block of code is allowed to complete, even though the interrupt occurs during execution of the suspended block of code. In prior art mechanisms, if an interrupt occurred during the execution of the suspended block of code, the interrupt would immediately cause the transaction to abort, possibly leaving the memory in an inconsistent state. Thus, the illustrative embodiments provide a mechanism for allowing interrupts to occur during the execution of a suspended block of code, with handling of the interrupts and rescheduling of the suspended block of code, such that the suspended block of code is allowed to complete prior to aborting the transaction. It is only when the execution of the code returns to the transaction that the transaction is aborted.

Figure 5A:
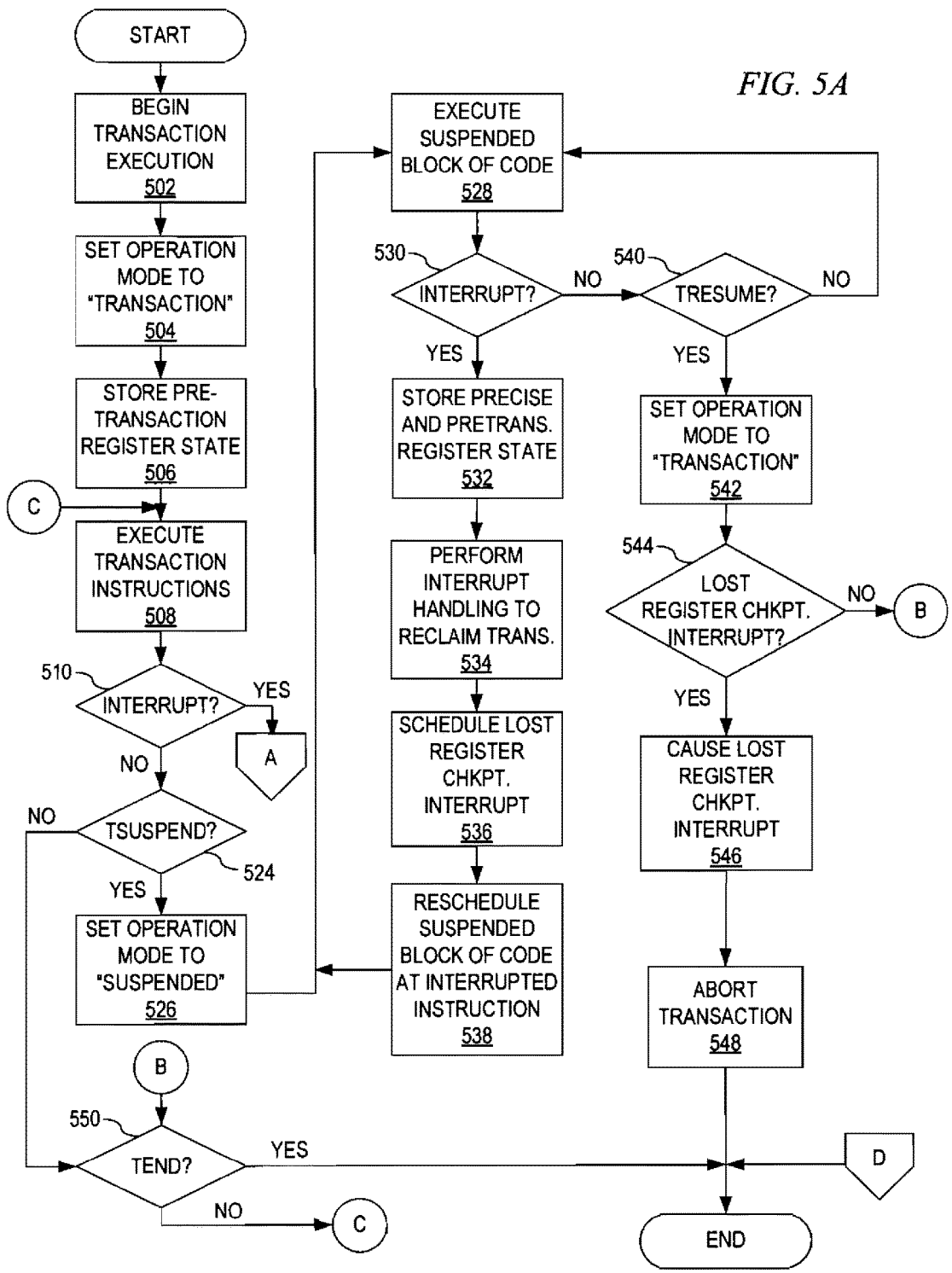

FIGS. 5A and 5B illustrate a flowchart outlining an example operation for handling execution of a suspended block of code within a transaction in accordance with one illustrative embodiment. The operations shown in FIGS. 5A and 5B may be implemented in software with hardware support, for example. That is, as shown in FIG. 3 and described above, various software elements may operate in conjunction with hardware elements to achieve the functionality and mechanisms of the illustrative embodiments.

As shown in FIG. 5A, the operation starts with the beginning of a transaction during the execution of code, such as by encountering a tbegin instruction (step 502). The mode of operation for the processor is set to "transaction," such as by setting a value in the mode register 314 to indicate a "transaction" mode of operation (step 504). The pre-transaction register state is stored, such as by copying the program registers 320 to the pre-transaction register state storage device 322 or to a thread context 362 in memory 360, for example (step 506). The transaction's instructions are then executed (step 508).

A determination is made as to whether an interrupt occurs during the execution of the transaction (step 510). If so, then the operation continues to step 512 in FIG. 5B. As shown in FIG. 5B, the processor operation mode is transitioned to a suspended state of operation (step 512) and a determination is made by the operating system as to whether to abort the transaction or not, such as based on the type of interrupt and other factors generally known in the art (step 514). If the operating system determines not to abort the transaction, then the interrupt is handled by an appropriate interrupt handler of the operating system and the transaction is resumed without aborting (step 516). Thereafter, the operation returns to step 508 where the transaction continues to execute.

If the operating system determines that that the transaction is to be aborted and the transaction facilities reclaimed, then the pre-transactional register state 518 is saved in the thread context of the thread corresponding to the transaction (step 518). The transactional facilities are then reclaimed (step 520) and the thread is eventually rescheduled using the pre-transactional register state (step 522). The operation then terminates.

If no interrupt occurs (step 510), a determination is made as to whether a transaction suspend instruction is executed (step 524). If not, the operation goes to step 550 where it is determined whether a transaction end instruction is processed (step 550). If so, then the operation terminates. If not, the operation returns to step 508 and continues to execute the transaction instructions.

If a transaction suspend instruction is executed (step 524), then the operation mode is set to a suspended mode of operation (step 526) and a suspended block of code is executed (step 528). During the execution of the suspended block of code, a determination is made as to whether an interrupt occurs (step 530). If so, then the precise register state and pre-transactional state are stored, such as by copying the current state of program registers 320 to a precise register state portion of the thread context 362 in memory 360 corresponding to the thread executing the transaction, and copying the pre-transactional state from the pre-transactional register state storage device 322 into a pre-transactional register state portion of the thread context 362 in memory 360, for example (step 532). Interrupt handling for the particular interrupt is performed to reclaim transaction facilities (step 534) and a lost register checkpoint interrupt is scheduled, such as by setting an appropriate bit to indicate to generate an interrupt upon resuming the transaction (step 536). The suspended block of code is then rescheduled at the interrupted instruction (step 538) and the operation returns to step 528 to continue the execution of the suspended block of code (step 528).

If an interrupt does not occur during the execution of the suspended block of code 530, a determination is made as to whether a transaction resume instruction is executed (step 540). If not, the operation continues to execute the suspended block of code (step 528). If a transaction resume instruction is executed, the operation mode is set back to a transaction mode of operation (step 542) and a determination is made as to whether a lost register checkpoint interrupt was generated (step 544). If not, then the operation goes to step 550 to determine if the transaction is to be ended. If so, then the lost register checkpoint interrupt is performed (step 546) and transaction abort operations are performed (step 548). The operation then terminates.

Thus, the illustrative embodiments provide mechanisms for allowing interrupts in suspended blocks of code to be handled without aborting the transaction. It is only upon resuming the transaction that the abort of the transaction is performed. In this way, the suspended block of code is permitted to continue to execute so that data regarding aborted transactions can still be gathered or other useful work can be performed despite the need to abort the transaction.

As mentioned above, the unbroken suspended execution mechanisms of the illustrative embodiments can be used for many different purposes including computer program tracing, debugging, and the like. In addition, the mechanisms of the illustrative embodiments may be used to support proper scheduling of threads in speculative multithreading. That is, the transaction suspend instruction may be used to provide a software based signaling mechanism that is used at the end of a speculative thread to determine when it is safe to commit the changes made by that thread.

In speculative multithreading, a sequence of speculative threads are spawned by a main thread where each speculative thread is assigned a sequence number identifying the thread and the position in the sequence in which the thread should commit. The mechanisms of the illustrative embodiments may be used to stall the commit of one thread until another thread indicates its completion such that commits are performed in a predefined order while still allowing parallel execution using multithreading facilities of a multithreaded data processing system. In this way, an efficient software based mechanism is provided to ensure proper ordering of threads.

Figure 6:
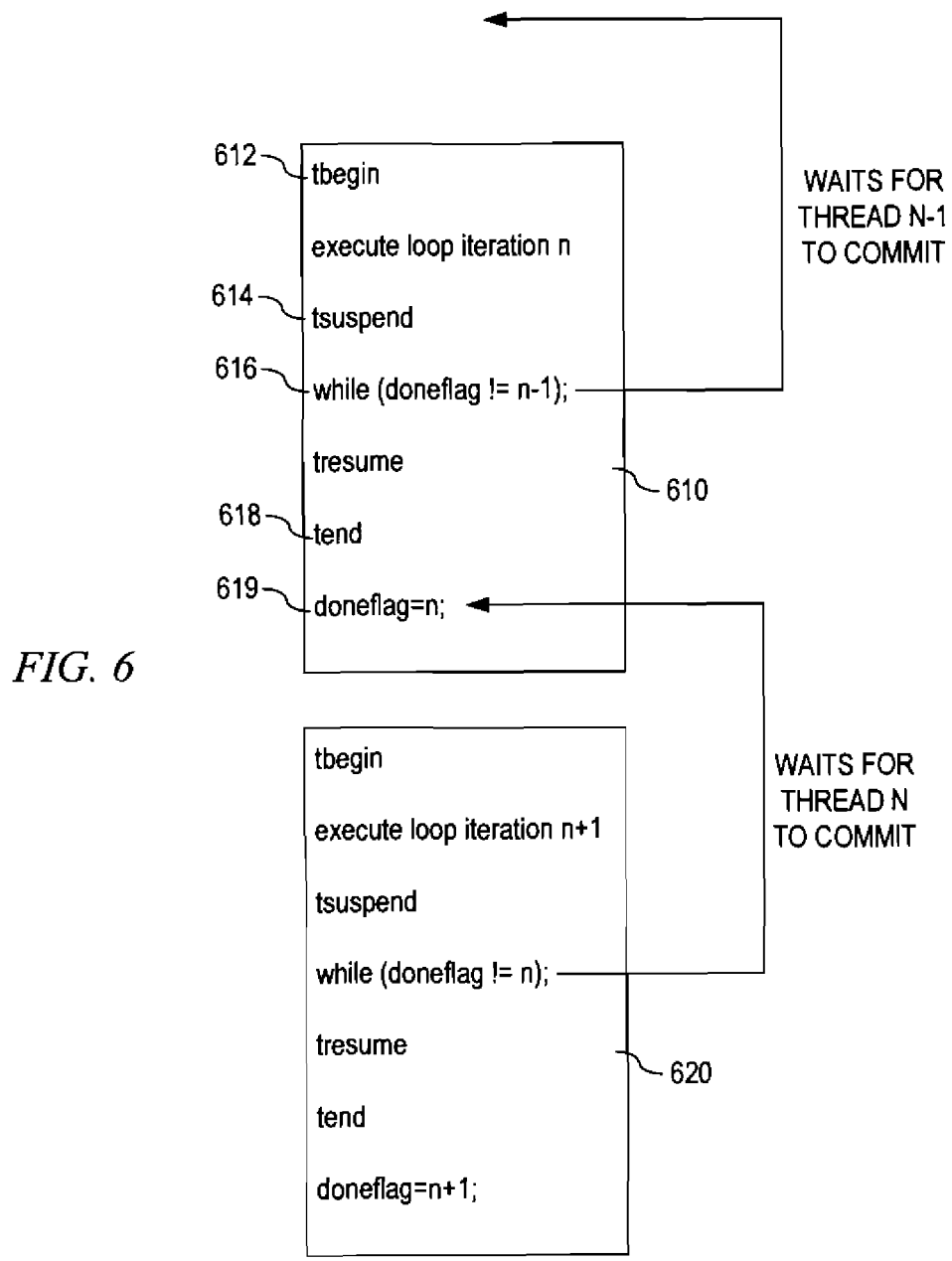
FIG. 6 is an example diagram illustrating code for two example threads that may be executed using the unbroken suspended execution mechanisms of the illustrative embodiments.

FIG. 6 is an example diagram illustrating code for two example threads that may be executed using the unbroken suspended execution mechanisms of the illustrative embodiments. In a first thread 610, i.e. speculative thread n, the thread 610 performs a transaction by executing a transaction begin instruction 612, followed by the execution of a loop iteration n, and then a transaction suspend instruction 614 which suspends the transaction is performed. The tsuspend instruction 614 causes a suspended block of code 616 to be executed in a non-transactional manner. In the depicted example, the suspended block of code comprises a while loop that spins on itself until a doneflag variable is equal to n−1.

That is, the doneflag variable stores the sequence number of the thread that last committed. If doneflag equals n−1, this means that the thread with sequence number n−1 was the last thread to complete. Hence, the tsuspend instruction causes the transaction associated with thread 610 to wait until the previous thread, i.e. thread n−1 has completed and set the doneflag to n−1, before the current thread 610 resumes, via the tresume instruction, and commits its changes. If an interrupt occurs during the execution of the suspended block of code 616, then the mechanisms previously described above would be implemented to handle this interrupt. Once the previous thread n−1 commits, i.e. executes the tend instruction, the doneflag is set to n−1, just as after the thread 610 executes tend 618, the doneflag is set to n 619.

A second thread 620, which executes a transaction for the n+1 iteration of the loop, performs a similar operation for a loop iteration of n+1. This thread also has a suspended block of code that includes the while loop that spins until the doneflag is equal to n, i.e. until the thread 610 having a sequence number just prior to the current thread 620 completes and commits its changes. Once the transaction resumes and ends, the doneflag is set to n+1.

Thus, each thread 610 and 620 executes its speculative chunk of work, i.e. iterations n and n+1 in the depicted examples, but does not commit until it has received notification that the prior thread has committed, as communicated though the shared memory variable "doneflag," which indicates the sequence number of the most recent thread to have successfully committed. In the depicted example, the speculative thread n polls the doneflag variable, delaying execution of the tend instruction to commit the transaction until doneflag contains the sequence number of the prior thread in the sequence. Once that thread has written doneflag, thread n will commit its own transaction, then set the doneflag variable value to its own sequence number. This, in turn, will notify the speculative thread n+1 620 that it is safe to commit its transaction.

Thus, using the transaction suspension mechanisms of the illustrative embodiments, polling for updates to the doneflag can occur within the transaction while the transaction is suspended. As a result, the sequencing of speculative threads may be supported without the need for dedicated hardware speculative thread signaling mechanisms, as are generally used in known systems. Moreover, the sequencing performed using suspended blocks of code in transactions may further make use of the interrupt mechanisms of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor and a transactional memory, for executing a transaction in the data processing system comprising:
   executing, by a processor of the data processing system, a transaction comprising one or more instructions that modify at least a portion of the transactional memory;
   suspending, by the processor, the transaction in response to a transaction suspend instruction being executed by the processor;
   executing, by the processor, a suspended block of code of the transaction in a non-transactional manner while the transaction is suspended;
   determining, by the processor, if an interrupt occurs while the transaction is suspended and the suspended block of code is executing; and
   delaying, by the processor, a transaction abort operation until after the transaction suspension is discontinued and the transaction resumes, in response to an interrupt occurring while the transaction is suspended, wherein the execution of the suspended block of code in a non-transactional manner completes execution without being aborted prior to discontinuing the transaction suspension.

2. The method of claim 1, further comprising:
   storing a pre-transaction program register state in a pre-transaction program register state storage device of the processor in response to execution of the transaction starting; and
   storing a copy of a current program register state from program registers in the processor, and a copy of the pre-transactional program register state from the pre-transaction program register state storage device of the processor, in a thread context associated with a thread executing the transaction, in response to determining that an interrupt occurs while the transaction is suspended.

3. The method of claim 2, further comprising:
   resuming the execution of the transaction after the transaction suspension is discontinued; and
   generating a lost register checkpoint interrupt in response to resuming the execution of the transaction after the transaction suspension is discontinued based on the transaction abort operation having been delayed, wherein the lost register checkpoint interrupt is an interrupt indicating a resumption of the suspended transaction following an interrupt occurring during execution of the suspended block of code.

4. The method of claim 3, further comprising:
   performing transaction abort handling in response to the lost register checkpoint interrupt being generated, wherein the transaction abort handling comprises rolling-back changes to the transactional memory made by the execution of the transaction prior to the suspending of the transaction, but not changes made to the transactional memory made by execution of the suspended block of code.

5. The method of claim 1, further comprising:
   rescheduling a thread executing the transaction using the pre-transactional program register state from a thread context of the thread after performing transaction abort handling.

6. The method of claim 1, wherein delaying the transaction abort operation comprises setting a lost register checkpoint interrupt bit in the processor to cause a lost register checkpoint interrupt to be generated when the transaction is resumed and continuing execution of the suspended block of code.

7. The method of claim 1, wherein a value in a mode register of the processor is set to a value indicating that the processor is operating in a suspended mode of operation in response to suspending the transaction, and wherein determining if an interrupt occurs while the transaction is suspended comprises:
   retrieving the value in the mode register in response to the interrupt occurring; and
   determining if the retrieved value from the mode register is set to the value indicating that the processor is operating in a suspended mode of operation.

8. The method of claim 2, further comprising:
   storing a flag value in association with contents of the pre-transaction program register state indicating whether the contents of the pre-transaction program register state storage device are valid or invalid, wherein the flag value is set by a process that reclaims facilities associated with the transaction when aborting execution of the transaction, and wherein the flag value is used to resolve race conditions between processes attempting to abort execution of the transaction.

9. The method of claim 1, wherein:
   the data processing system is a multithreaded data processing system executing a sequence of threads comprising at least a first speculative thread and a second speculative thread, and wherein each thread has an associated sequence number specifying its position in the sequence of threads,
   the first speculative thread is used to execute the transaction,
   the second speculative thread is used to execute a second transaction, the suspended block of code executes a loop to wait until the second transaction writes the sequence number of the second speculative thread to a variable, monitored by the suspended block of code, indicating that execution of the second transaction has completed execution successfully, and the execution of the transaction associated with the first speculative thread is resumed in response to the sequence number of the second speculative thread being written to the variable.

10. A method, in a multithreaded data processing system having a processor and a transactional memory, for executing a transaction in the multithreaded data processing system comprising:

executing, by at least one processor of the multithreaded data processing system, a sequence of threads comprising at least a first speculative thread and a second speculative thread, wherein each thread has an associated sequence number specifying its position in the sequence of threads, and wherein the first speculative thread is used to execute a first transaction and the second speculative thread is used to execute a second transaction;

suspending, by the at least one processor, the first transaction in response to a transaction suspend instruction being executed by the at least one processor;

executing, by the at least one processor, a suspended block of code in a non-transactional manner while the first transaction is suspended, wherein the suspended block of code executes a loop to wait until the second transaction writes the sequence number of the second speculative thread to a variable, monitored by the suspended block of code, indicating that execution of the second transaction has completed execution successfully; and resuming, by the at least one processor, execution of the first transaction associated with the first speculative thread in response to the sequence number of the second speculative thread being written to the variable.

11. A data processing system, comprising:

a processor; and a transactional memory coupled to the processor, wherein the processor is configured to execute a transaction comprising one or more instructions that modify at least a portion of the transactional memory;

suspend the transaction in response to a transaction suspend instruction being executed by the processor;

execute a suspended block of code of the transaction in a non-transactional manner while the transaction is suspended;

determine if an interrupt occurs while the transaction is suspended and the suspended block of code is executing; and delay a transaction abort operation until after the transaction suspension is discontinued and the transaction resumes, in response to an interrupt occurring while the transaction is suspended, wherein the execution of the suspended block of code in a non-transactional manner completes execution without being aborted prior to discontinuing the transaction suspension.

12. The data processing system of claim 11, wherein the processor is further configured to:

store a pre-transaction program register state in a pre-transaction program register state storage device of the processor in response to execution of the transaction starting; and store a copy of a current program register state from program registers in the processor, and a copy of the pre-transactional program register state from the pre-transaction program register state storage device of the processor, in a thread context associated with a thread executing the transaction, in response to determining that an interrupt occurs while the transaction is suspended.

13. The data processing system of claim 12, wherein the processor is further configured to:

resume the execution of the transaction after the transaction suspension is discontinued; and generate a lost register checkpoint interrupt in response to resuming the execution of the transaction after the transaction suspension is discontinued based on the transaction abort operation having been delayed, wherein the lost register checkpoint interrupt is an interrupt indicating a resumption of the suspended transaction following an interrupt occurring during execution of the suspended block of code.

14. The data processing system of claim 13, wherein the processor is further configured to:

perform transaction abort handling in response to the lost register checkpoint interrupt being generated, wherein the transaction abort handling comprises rolling-back changes to the transactional memory made by the execution of the transaction prior to the suspending of the transaction, but not changes made to the transactional memory made by execution of the suspended block of code.

15. The data processing system of claim 11, wherein the processor is further configured to:

reschedule a thread executing the transaction using the pre-transactional program register state from a thread context of the thread after performing transaction abort handling.

16. The data processing system of claim 11, wherein the processor delays the transaction abort operation by setting a lost register checkpoint interrupt bit in the processor to cause a lost register checkpoint interrupt to be generated when the transaction is resumed and continuing execution of the suspended block of code.

17. The data processing system of claim 11, wherein a value in a mode register of the processor is set to a value indicating that the processor is operating in a suspended mode of operation in response to suspending the transaction, and wherein the processor determines if an interrupt occurs while the transaction is suspended by:

retrieving the value in the mode register in response to the interrupt occurring; and determining if the retrieved value from the mode register is set to the value indicating that the processor is operating in a suspended mode of operation.

18. The data processing system of claim 12, wherein the processor is further configured to:

store a flag value in association with contents of the pre-transaction program register state indicating whether the contents of the pre-transaction program register state storage device are valid or invalid, wherein the flag value is set by a process that reclaims facilities associated with the transaction when aborting execution of the transaction, and wherein the flag value is used to resolve race conditions between processes attempting to abort execution of the transaction.

19. The data processing system of claim 11, wherein:

the data processing system is a multithreaded data processing system executing a sequence of threads comprising at least a first speculative thread and a second speculative thread, and wherein each thread has an associated sequence number specifying its position in the sequence of threads, the first speculative thread is used to execute the transaction, the second speculative thread is used to execute a second transaction, the suspended block of code executes a loop to wait until the second transaction writes the sequence number of the second speculative thread to a variable, monitored by the suspended block of code, indicating that execution of the second transaction has completed execution successfully, and the execution of the transaction associated with the first speculative thread is resumed in response to the sequence number of the second speculative thread being written to the variable.

20. A computer program product comprising a non-transitory computer readable storage medium having a computer readable program stored therein, wherein the computer readable program, when executed on a computing device, causes the computing device to:

execute a transaction comprising one or more instructions that modify at least a portion of the transactional memory;

suspend the transaction in response to a transaction suspend instruction being executed by a processor of the computing device;

execute a suspended block of code of the transaction in a non-transactional manner while the transaction is suspended;

determine if an interrupt occurs while the transaction is suspended and the suspended block of code is executing; and delay a transaction abort operation until after the transaction suspension is discontinued and the transaction resumes, in response to an interrupt occurring while the transaction is suspended, wherein the execution of the suspended block of code in a non-transactional manner completes execution without being aborted prior to discontinuing the transaction suspension.

21. A method, in a data processing system having a processor and a transactional memory, for executing a transaction in the data processing system comprising:

executing, by a processor of the data processing system, a transaction comprising one or more instructions that modify at least a portion of the transactional memory;

suspending, by the processor, the transaction in response to a transaction suspend instruction being executed by the processor; and executing, by the processor, a suspended block of code in a non-transactional manner while the transaction is suspended, wherein:

the data processing system is a multithreaded data processing system executing a sequence of threads comprising at least a first speculative thread and a second speculative thread, and wherein each thread has an associated sequence number specifying its position in the sequence of threads, the first speculative thread is used to execute the transaction, the second speculative thread is used to execute a second transaction, the suspended block of code executes a loop to wait until the second transaction writes the sequence number of the second speculative thread to a variable, monitored by the suspended block of code, indicating that execution of the second transaction has completed execution successfully, and the execution of the transaction associated with the first speculative thread is resumed in response to the sequence number of the second speculative thread being written to the variable.

* * * * *